March 12, 1968 R. NOUEL 3,372,433
MOLD CLAMPING APPARATUS
Filed April 15, 1963 4 Sheets-Sheet 1
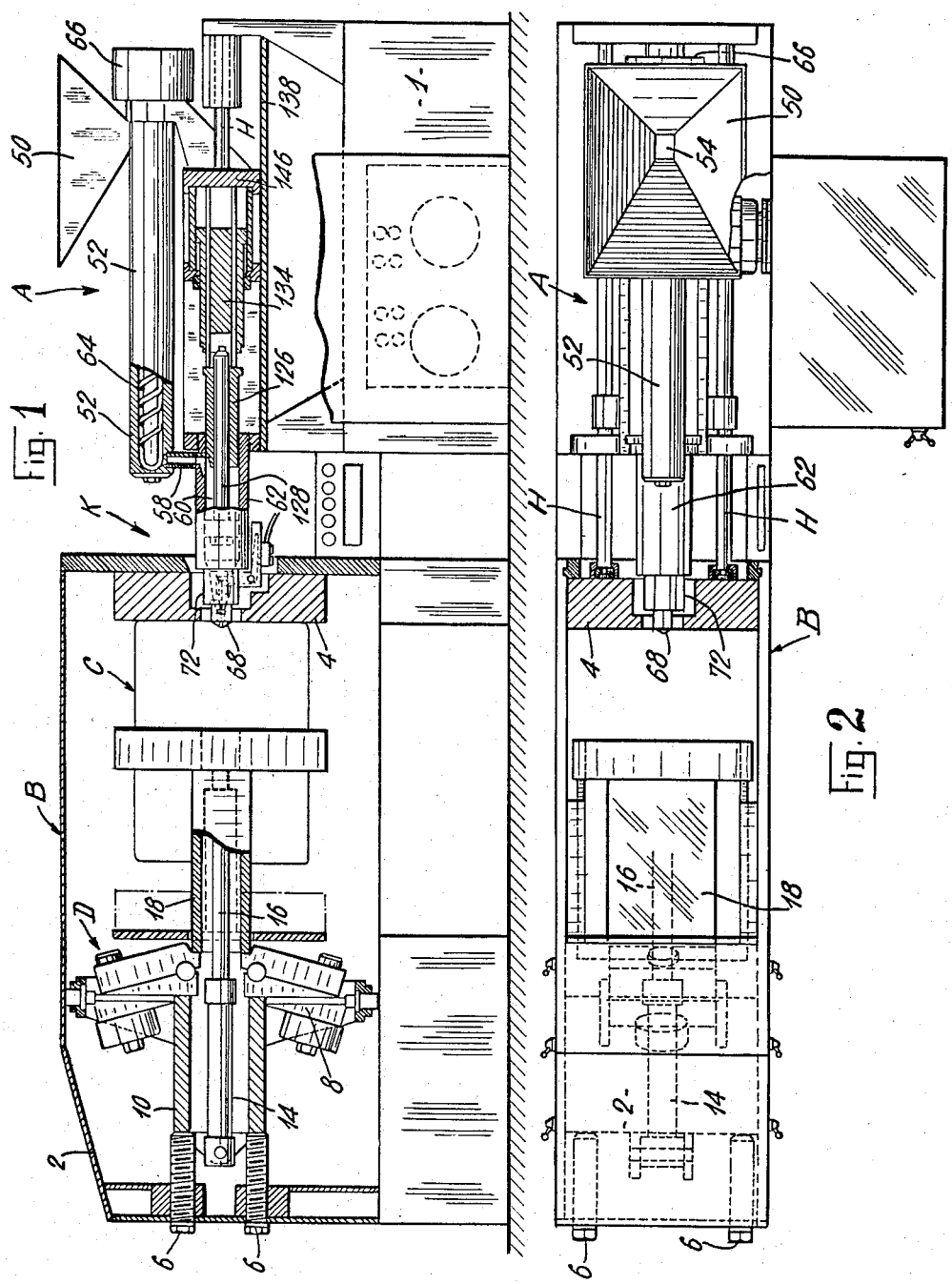

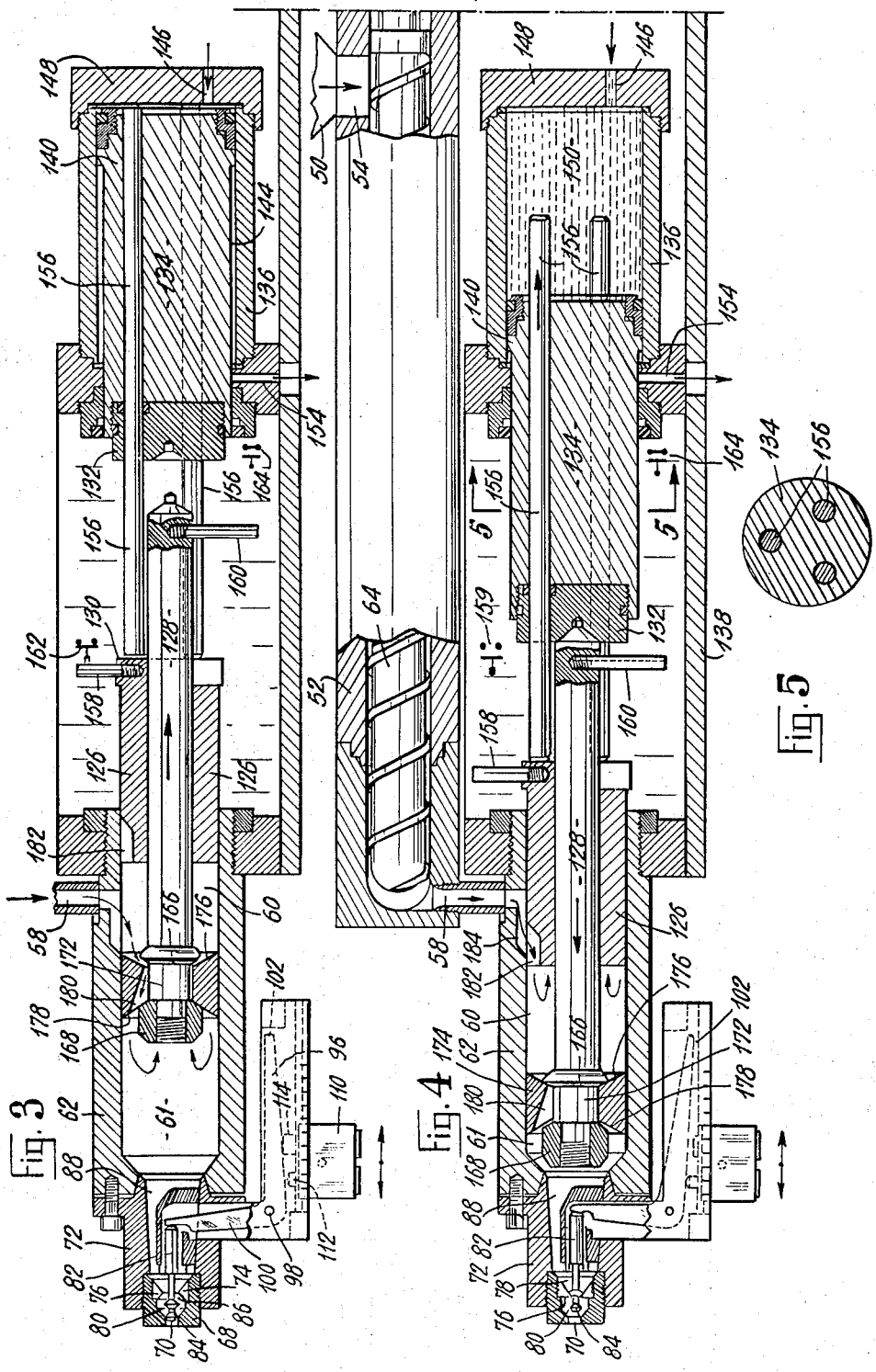

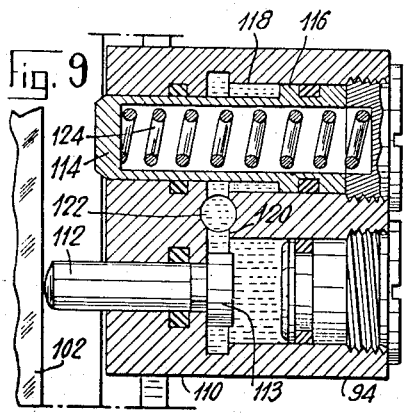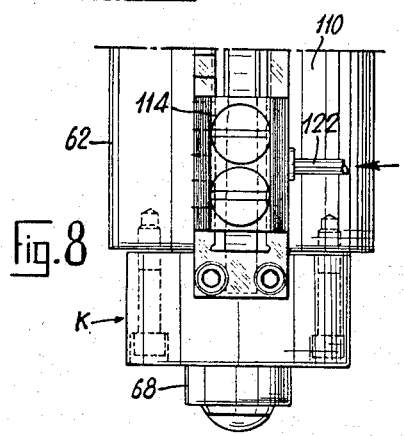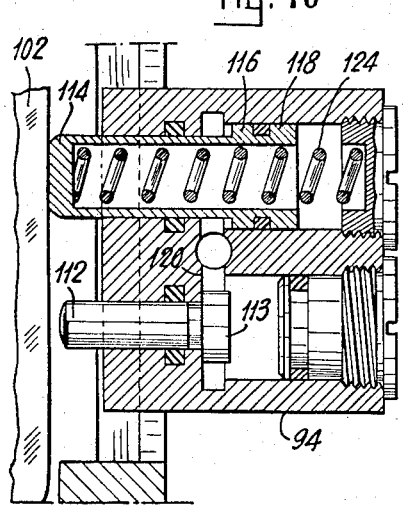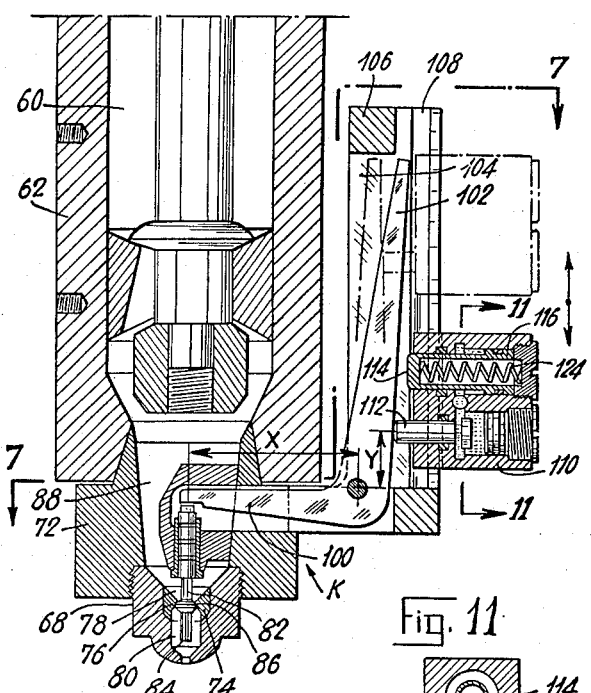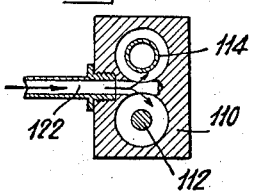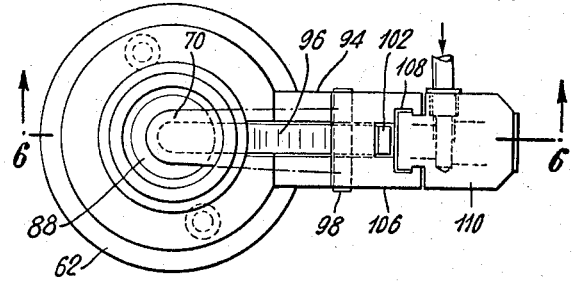

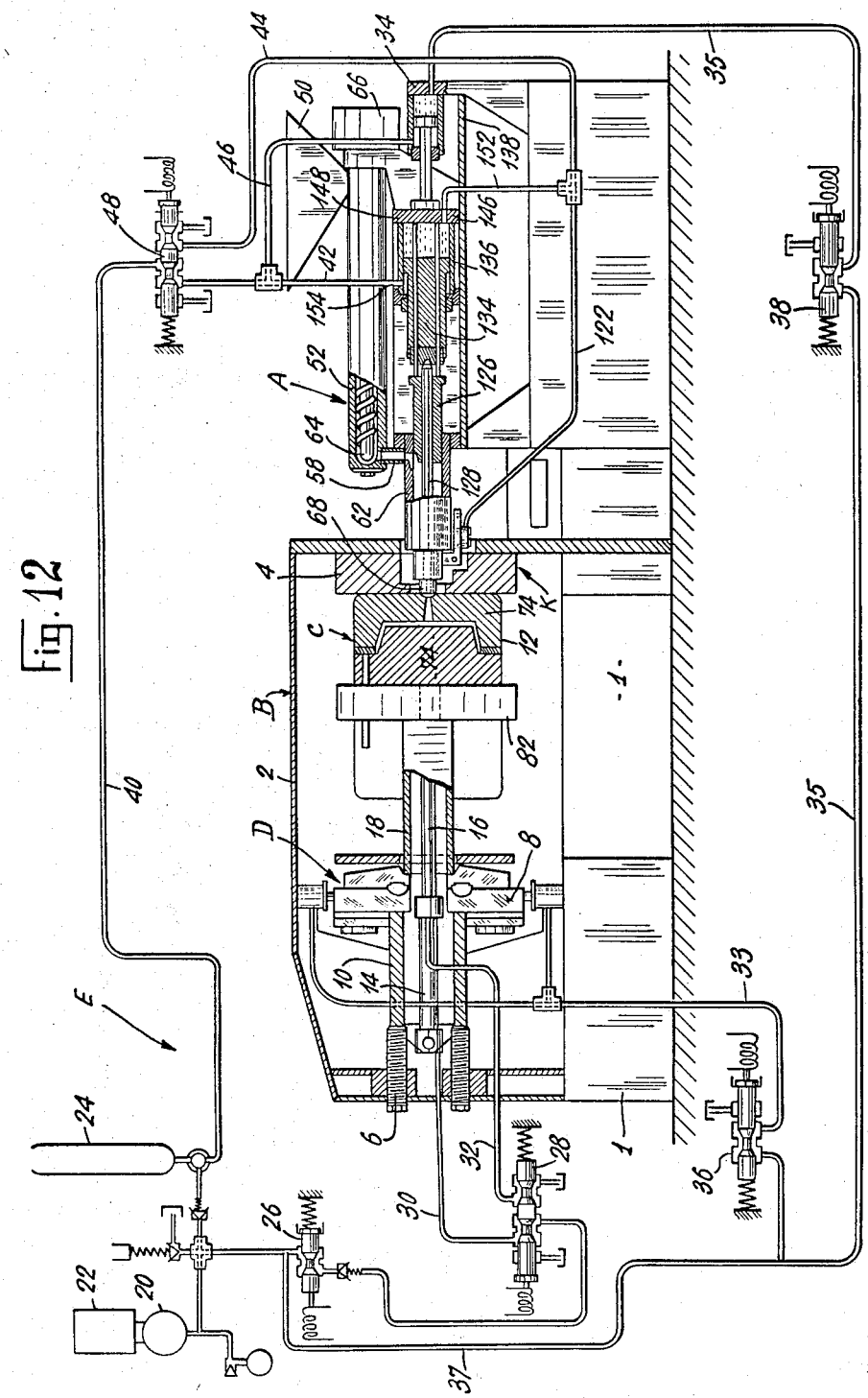

United States Patent Office 3,372,433
Patented Mar. 12, 1968

3,372,433
MOLD CLAMPING APPARATUS
Robert Nouel, Villejuif, Seine, France, assignor to Inventions Finance Corporation, a corporation of Delaware
Continuation-in-part of application Ser. No. 173,103, Feb. 13, 1962. This application Apr. 15, 1963, Ser. No. 273,145
Claims priority, application France, Dec. 22, 1962, 1,313/62
12 Claims. (Cl. 18—30)

The present invention relates to an apparatus for clamping mold parts together. The invention finds particular utility as applied in the manufacture of large size plastic articles.

The instant application is a continuation-in-part of application Ser. No. 173,103, filed Feb. 13, 1962 and now Patent No. 3,241,187.

An appartaus constructed in accordance with the present invention comprises basically four sections, namely, a base machine section including supports and base operating components, an injection-transfer mold-feed section, a feed regulation and control section, and a compressive force-applying section which maintains mold parts in compressive engagement during an injection operation.

The compressive force-applying section includes hydraulically actuated force multiplying units which are mounted on the base machine section, and which eliminate the heretofore conventional type piston and cylinder toggle pressing systems. The hydraulically actuated force multiplying units are constructed in accordance with my prior application Ser. No. 173,103.

The compressive force-applying section of an apparatus constructed in accordance herewith further includes means for adjustably mounting the hydraulically actuated force multiplying units so as to thereby adapt a machine of comparatively small dimensions for handling molds of varying size and shape. Still further, the compressive force-applying section of an apparatus constructed in accordance herewith is so designed as to permit adjustment of the applied thrust and thereby the accommodation of molds of varying characteristics, and the accommodation of injection pressures of varying strengths.

The feed control and regulation section of an apparatus constructed in accordance herewith effectively maintains a prescribed equilibrium force relationship. The relationship is, specifically, one wherein the forces and/or pressures compressing the mold parts into engagement always greatly exceed the distributed injection pressures and forces within the mold tending to separate the mold parts. Such equilibrium or relationship permits the economical production of molded articles having a frontal surface area which greatly exceeds the area of the injection piston— a result which has not been heretofore conveniently or economically obtainable.

The feed regulation and control section incorporates as one important operating assembly thereof, a regulator which serves the dual function of limiting the pressure within the mold to a regulatable and predetermined value irrespective of the final injection pressure, and of closing off transfer between the injection feed means incorporated, and the mold parts.

The injection transfer and mold feed section of an apparatus constructed in accordance herewith is possibly the most significant aspect of the present invention. This section cooperates with the other sections discussed above and incorporates a feed and transfer arrangement which is free of the problems heretofore experienced. More specifically, the injection transfer and mold feed section constructed in accordance with the apparatus embodiments hereof, and operating in accordance with the method embodiments hereof, includes a continuously rotating input screw pre-plasticizing assembly. Such assembly is in transfer communication with the injection cylinder or passageway, but still the invention contemplates continuous operation of the pre-plasticizing screw. The ability to obtain this continuous operation permits the molding of articles having large frontal surfaces without facing the difficulties experienced with prior arrangements wherein the screw must be stopped during the injection operation, and/ or wherein the sealing problems within the apparatus prevented the use of a continuously operating screw in the fabrication of molded articles having large frontal surfaces.

Consistent with the foregoing, the injection transfer mold feed section of an apparatus constructed in accordance herewith, includes, in addition to the continuously operating pre-plasticizing screw assembly, a transfer chamber and an injection chamber having volumes which are simultaneously varied, and selectively closable means communicating the chambers so as to selectively establish and close material transfer therebetween regardless of the direction in which the volume is being changed in either chamber.

The invention will be better understood, and advantages other than those set forth above will become apparent, when consideration is given to the following detailed description. Such description refers to the annexed drawings presenting preferred and illustrative embodiments of the invention.

In the drawings:

FIGURE 1 is a side elevational view, partly in vertical section, of a molding machine constructed in accordance herewith and incorporating the feeding system hereof.

FIGURE 2 is a plan view of the machine shown in FIGURE 1 with a portion of the molding machine shown in horizontal section for purposes of clarity.

FIGURE 3 is a vertical sectional view of a portion of the mold feeding system hereof showing the components thereof in the positions they occupy during the state of operation wherein cooling and feeding of plastic material to the injection chamber are performed.

FIGURE 4 is a vertical sectional view, similar to FIGURE 3, but further showing the extrusion screw mechanism of the feeding system and the disposition of components during the stage of operation wherein the mold has just been filled with plastic material from the injection feeding apparatus and the material is flowing from the extrusion cylinder into the injection cylinder thereof.

FIGURE 5 is a sectional view taken on line 5—5 in FIGURE 4 showing certain details of the hydraulic actuator of the feeding apparatus.

FIGURE 6 is an enlarged horizontal sectional view, taken on line 6—6 of FIGURE 7 and presents in detail the regulator unit of the system controlling flow of material from the injection nozzle of the feeding apparatus.

FIGURE 7 is plan view of the injection nozzle regulator unit taken on line 7—7 of FIGURE 6.

FIGURE 8 is a side elevational view looking to the left in FIGURE 6 and showing further details of the regulator unit.

FIGURE 9 is an enlarged vertical sectional view of the hydraulic control portion of the regulator unit showing the relative position of the components thereof during the injection stage of operation.

FIGURE 10 is a vertical sectional view corresponding to FIGURE 9, but showing the components in the position they occupy when the regulator closes the injection nozzle at the time the mold has been filled.

FIGURE 11 is a vertical sectional view taken on line 11—11 of FIGURE 6.

FIGURE 12 is a side view partially in vertical section of the molding machine hereof equipped with the injection feeding apparatus, and showing schematically the fluid pressure actuating system therefor.

As illustrated in FIGURES 1, 2 and 12 the injection transfer-mold feed section A of the apparatus embodiment of the present invention is applied to the base machine section B and this permits the molding of relatively heavy plastic articles of the order for example of at least one kilogram in weight, as explained more fully below. The molding machine further includes a feed regulation and control section C and a compressive force applying section D. The overall apparatus is actuated and controlled in all its phases of operation by a unitary hydraulic system E.

Referring now in more detail to individual sections of the apparatus hereof, it will be noted from FIGURES 1, 2 and 12 that the machine section B includes generally a support structure 1 having a housing 2 enclosing a mold platen 4, to which one of the mold sections 12 is attached. The platen 4 is positioned at one end of, and in axial alignment with, the operating components of the injection transfer mold feed section A. At the opposite end of the housing 2, there is provided an adjustable support means 10 for adjustably positioning components of a force multiplying and thrust applying mechanism 8. This mechanism comprises a plurality of compact hydraulically actuated units for maintaining the mold sections 12 in compressive engagement under great pressure during injection feeding and various other molding operations. By adjustment of the support structure 10, the force applying mechanism 8 can be adjustably positioned in order to enable the use of mold sections of different sizes for different size and shape articles. The support structure 10 for the force applying mechanism 8 also has mounted thereon, axially of the mold sections 12, a hydraulic cylinder 14 having a piston housed therein. The piston has a rod 16 extending therefrom and connected to the nearest axially aligned mold section 12 to effect its opening and closing movements relative to the other mold section adjacent the transfer-feed section A. A tubular thrust member 18 is disposed concentrically of the rod 16 and secured to the same mold section to which rod 16 is secured. Thrust member 18 is adapted to be engaged by the jaw means of the force applying mechanism 8 when locked thereby during the injection feeding operation.

The hydraulic system for actuating the machine section B and the transfer feed section A briefly described above, includes a hydraulic pump 20, driven by a motor 22, which charges an accumulator 24. The accumulator supplies hydraulic fluid under pressure to the cylinder 14 by way of the distributor valves 26 and 28 and the conduits 30 and 32. A conduit 37, including branch conduits 33 and 35, also extends from the accumulator 24 to supply fluid under pressure to actuate the mold force applying mechanism 8 and further to operate hydraulic jack 34 which as explained below, serves to adjustably position components of the transfer-feed section A relative to the mold under the control of valves 36 and 38 respectively. Another conduit 40, including branch conduits 42, 44 and 46, extends from the accumulator 24 under control of valve 48 to the injection mechanism A to supply pressure fluid to actuate certain feeding components as well as the jack 34, all in a manner to be later described.

With particular reference to FIGURES 1, 2 and 12, it will be noted that transfer-feed section A comprises an extrusion cylinder 52 on which is mounted a hopper 50 for receiving the primary molding material in the solid state. The hopper communicates with the interior of the cylinder 52 by means of a molding material flow passage 54 entering the cylinder at the right end thereof. The cylinder 52, may be heated externally by any suitable means. It is mounted on a raised frame structure 138 carried by support mean 1 and is secured thereon by any suitable means. At its left end the extrusion cylinder 52 communicates through duct or passage 58 with a cylindrical transfer chamber 60 interiorly of an injection vessel or structure 62. The vessel 62 is supported by a suitable connection in a vertical wall portion of the support frame 138. An extrusion screw or worm 64 is rotatably mounted axially in cylinder 52, and is of such size as to conform substantially with the interior dimensions of the cylinder to thereby form a molding material extrusion feeding device. A suitable motor assembly 66 at the right end of the cylinder 52, as shown, rotatably drives the worm 64. Slide means suitably secured to the molding machine, such as members H, H, are adapted to slidably support and maintain the injection feeding apparatus in proper position and alignment with respect to the mold structure of the machine section B. The entire section A is slidably positioned on section B, and moveable under the control of hydraulic jack 34.

INJECTION REGULAR CONTROL

Bolted or otherwise secured to the end of the injection vessel 62, and disposed adjacent the mold structure of the machine, is an injection nozzle regulator or control unit K. This unit includes an injection nozzle 68 which has an injection orifice 70 axially of its end facing towards the mold structure C. The nozzle 68 is axially and threadly secured in an elongated nozzle housing 72 sealingly closing the end of the injection vessel 62. Mounted in the nozzle 68 intermediate its length is a member 74 forming a valve seat and having a valve orifice 76 in axial alignment with the injection orifice 70. The member 74 divides the nozzle 68 into small nozzle chambers 78 and 80 to the right and left thereof, respectively, as shown in the drawings.

A slide valve 82, slidably supported in nozzle housing 72 in alignment with orifices 70 and 76, has an enlargement 84 on its end adjacent orifice 70, which enlargement is adapted to close the orifice 70 when slid therein. Spaced from the enlargement 84, a second enlargement 86 is provided on valve 82. The enlargement 86, when moved into valve orifice 76, closes this orifice. A passage or injection channel 88 extends longitudinally of the nozzle housing 72 and connects nozzle chamber 78 with the interior of the adjacent injection cylinder vessel 62.

The regulator portion of the injection nozzle regulator control structure K, noting particularly FIGURE 6, comprises an L-shaped support frame 94 including an arm extending laterally from the nozzle housing 72 and another arm 106 that projects parallel with and beneath the injection vessel 62. At the junction of the two arms of the L-shaped frame 94, a bellcrank lever 96 is pivotally mounted on a pin 98 disposed a fixed distance X from the axis of the valve 82. The vertical arm portion 100 of the lever bears against the end of the slidable valve 82 remote from its end portion 84. The other arm 102 of the bellcrank extends generally horizontally within and along a vertical slot 104 of the angular lower arm 106 of the L-shaped frame 94.

Within a slideway 108 provided in the vertical slot of the lower arm 106 of the frame, is slidably and adjustably positioned an injection regulator device 110. This device has two parallel disposed pistons 112 and 114 projectable toward, and adapted to engage, arm 102 of the bellcrank to provide a thrust there against under conditions to be later described. The piston 112 nearer to pin 98, is by reason of the adjustability of the device 110 along slideway 108, disposed an adjustable distance Y from pin 98 and comprises an injection regulating piston. The second piston 114 comprises a positioning piston for the valve 82. Piston 114 has a lower portion of enlarged diameter forming an inner piston 116 slidable in the cylinder 118 which communicates at its upper end with a hydraulic chamber extending below piston 112 by means of a cross passage 120 into which an external conduit 122 opens for conducting hydraulic operating fluid from the external source into the device. The positioning piston 114 is normally urged in a direction outwardly of the device towards and into engagement the lever arm 102, by means of a coiled spring 124 when there is an absence of hydraulic pressure in the cylinders.

Opposing the force on the valve exerted by the fluidized plastic material in chamber 80, is the force exerted on the right hand end of the valve means by the lever 100. This force is created by the regulating means operating against the arm 102 of lever 96.

Piston 112 when actuated by hydraulic pressure in the cylinder beneath it, engages lever 102 at a point a distance Y from the pivot 98. The distance Y is adjusted so that the force exerted by the lever 100, as the result of the hydraulic pressure in the cylinder, just balances the force on the end of the valve means due to the fluidized plastic material. At the same time, hydraulic pressure acting in the cylinder 118 forces the piston 116 downwardly against the spring 124 to compress the spring 124 and disengage piston 114 from the lever 102.

In the operation of the injection apparatus, pressures in the chamber 80 vary with types of pieces being molded and with their sizes and their shapes. As a consequence, it is essential for the proper operation of the apparatus to provide for different operating pressures in the chamber 80 by providing a means to adjust the balancing force. Heretofore, this was accomplished by the varying of the pressures acting in the cylinder beneath a piston comparable to the piston 112.

In the present structure, the hydraulic pressure is not varied to obtain the new opposing force. Instead, the regulation means is adjusted relative to the arm 102 by sliding motion in the guiding and supporting means 108 to a new position where the Y distance relative to the X distance between the pivot 98 and the end of the lever 100 provides the proper compensating force on the end of the valve means. The regulating means is adjusted to the proper distance Y to obtain the proper force on the right hand end of the valve to oppose the force exerted by the plastic fluid on the left hand end of the valve means during the injection phase of operating cycle of the transfer piston. Once so adjusted, it remains fixed for use until the apparatus is set up for a molding of a different piece requiring different pressures.

Piston 112 operates on the lever 102 when hydraulic pressure is exerted in the regulating means to maintain the valves 84 and 86 spaced from their respective seats, that is, during the injection phase of operation of the apparatus. As the mold becomes filled with fluidized plastic material, the back pressure resisting the flow of fluidized plastic builds up and this pressure is transferred to chamber 80. It acts on the valve means to force the valve 86 against its seat to close orifice 76 and stop the flow of fluidized plastic material into chamber 80. This action of the valve comes about by reason of the increased pressure in chamber 80 producing a force on the valve exceeding the force exerted on the valve by the regulating means.

At about the same time as the valve 86 bcomes seated, the pressure on the right side of the valve 86 is reduced. Also, the hydraulic pressure in the cylinder beneath the piston 112 is released and the pressure exerted thereby is relaxed and the piston 114 simultaneously engages the lever 102 at a distance greater than distance Y to force the valve means towards the left where the valve 84 engages its seat about orifice 70 to close the same against further injection. The valve remains in this position until it is desired to repeat the cycle of operations.

When a new mold is presented at the injection station and the injection apparatus has been moved into engagement with the mold by the jack means 34, pressure is applied to the fluidized plastic in the cylinder 62 and the hydraulic pressure is again established in the regulating means beneath the piston 112 and above the piston 114. The pressure from the plastic acting on the left side of the valve 86 forces it towards the right to open the valve 84. Thereafter the regulating force exerted on the lever 100 by piston 112 comes into play and the cycle of operations are repeated as above stated.

INJECTION-TRANSFER-CHAMBER

In the end portion of the transfer chamber 60 of the injection cylinder vessel 62 remote from the injection nozzle 68 is slidably mounted a relatively long cylindrical scavenging piston 126 which forms an adjustable closure for the adjacent end of the transfer chamber. Piston rod 128 extends axially through the scavenging piston 126 for free sliding movement therein. Piston 126, on the extreme end thereof extending exteriorly of chamber 60, is formed with a stop flange 130 to limit movement of the piston into the chamber 60. The end of slidable piston rod 128 extending outwardly through scavenging piston 126 has an abutment which is adapted to be engaged by an abutment plate 132. Abutment plate 132 is mounted on the adjacent end face of an axially aligned hydraulic injection piston member 134, slidably mounted in a hydraulic power cylinder 136, fixedly mounted on frame support 138. The piston member 134 is enlarged at 140 to form fluid pressure chambers 144 and 150 on opposite sides thereof in the cylinder 136. Suitable packing is provided on the piston portion 140 and the cylinder 136 for effective sealing purposes. An opening 146 in the outer end 148 of cylinder 136 provides a fluid flow connection to chamber 150 from a branch conduit 152 which also has flow connection with the conduit 122 opening into the regulator unit 110. A connection 154 for pressure fluid flow to chamber 144 of hydraulic power cylinder 136 extends through the support structure of cylinder 136 and has connection to another portion of the fluid pressure system.

Extending longitudinally of injection pistion 134 in the hydraulic cylinder 136 in equally spaced relation to each other are a plurality freely slidable abutment rods or auxiliary pistons 156 which at one end bear at all times against the outer end face of scavenging piston 126 while the opposite ends extend into pressure chamber 150 of hydraulic cylinder 136.

The stop flange 130 of the scavenging piston 126 has fixed thereto a lug or dog 158 while the adjacent end of piston rod 128 likewise carries a dog 160, each of the dogs 158 and 160 being adapted to engage, under certain conditions of operation to be described, with electrical contacts 162 and 164 respectively of an operating electrical control circuit (not shown) for the apparatus, the contacts 162 and 164 being opened and closed respectively by the respective dogs 158 and 160.

Piston rod 128 within the cylindrical transfer chamber 60 has formed thereon a combined abutment and valve flange 166 spaced from its end which end has a diameter enlarged relative to that of the rod and threaded to receive a nut 168 thereon. Intermediate the nut 168 and the abutment-valve flange 166 a section of 172 of the piston rod 128 carries a piston member 174 freely slidable thereon with slight clearance and limited in its sliding movement by the nut and abutment-valve flange. The end faces of piston member 174 are of hollow conical shape forming bearing surfaces 176 and 178, the bearing surface 176 being engaged by a complementary shaped portion of the abutment-valve flange 166 on the piston rod 128 in one direction of rod movement while the other bearing surface 178 engages a complementary-shaped surface on nut 168 during the opposite direction of rod movement. A plurality of equally circularly spaced longitudinally tapered passages 180 are provided in the piston 174 extending between the bearing surfaces 176 and 178, the large end of the passage 180 terminating in surface 178 and opening radially outwardly of the periphery of nut 168 so as to be open at all times, and even when the piston bearing surface 178 is in contact with the nut. The small ends of passages 180 terminate in the piston bearing surface 176 and are completely closed by the rod abutment-valve flange 166 when the flange 166 is in engagement with the bearing surface 176 but are open and free of the abutment-flange 166 when nut 168 is in engagement with the bearing surface 178 thereby providing passages for relatively free flow of plastic material through the piston under conditions herein disclosed.

In the periphery of the scavenging piston 126 is an elongated channel or groove 182 opening to the end face of the piston in transfer chamber 60. A similar registering groove 184 is formed in the interior surface of the wall of vessel 62 forming the cylindrical wall of the transfer chamber 60.

OPERATION OF THE INJECTION TRANSFER SYSTEM

The molding machine and injection feeding apparatus herein disclosed functions as follows:

Assume that fluid under pressure from the hydraulic system has initially closed and clamped the mold sections 12 as by operation of hydraulic jack 14 and the force applying means 8. Also assume that by operation of the hydraulic motor or jack 34, the entire feeding assembly A slides on rods H, H into feeding position adjacent the feeding or plastic admission port of the mold platen 4 where it is maintained and the injection piston 134 is positioned as shown in FIGURE 3.

The primary plastic material, which has been placed or poured in the hopper 50 flows into the extrusion cylinder 52 by way of the cylinder inlet passage 54 and it is then advanced progressively therethrough towards the outlet duct 58 by rotation of the worm 64. This results in forcing the material into transfer chamber 60 as indicated in FIGURE 3, through the now open tapered piston passages 180 into, and filling the injection chamber 61. As the plastic molding material is moved along in extrusion cylinder 52 by worm 64, it progressively changes from the solid state to a liquid plasticized state by reason of the external heating means therefor (not shown).

Fluid under pressure, such as hydraulic fluid, having been admitted to pressure chamber 150 of cylinder 136 causes the end 132 of injection piston 134 to thrust against the end of piston rod 128 which is forced to move toward the injection channel 88. As the piston rod 128 is moved by hydraulic injection piston 134 the abutment-valve flange 166 of the piston rod 128 thrusts against bearing surface 176 of piston 174 closing the ends of the tapered piston passages 180. As the now-in-effect solid piston 174 moves to the left in FIGURE 4 under the action of piston rod 128, it forces the plasticized material contained in the injection chamber 61 through injection channel 88, thence through the orifice 70 of the injection nozzle 68 which in the meantime has been opened by plastic fluid pressure, and thence towards the mold of the molding machine. It is, of course, to be understood for this operation that the nozzle 68 at this time is held tightly against the admission port of the mold, as indicated in FIGURE 12, to prevent escape of the plasticized material.

For opening the valve 84 and port 70, the pressure now acting on the hydraulic fluid in compression chamber 150 (and simultaneously released from chamber 144) of cylinder 136 is transmitted to the regulator unit 110 via conduit 122 (FIGURE 12) and thrusts against the lower enlarged end 116 of the positioning piston 114 to thereby withdraw the piston 114 within the casing of the nozzle valve regulator 110 against the outward thrust of its spring 118. At the same time the pressure thrusts the regulating piston 112 outwardly of the regulator casing 110 until stopped by the enlarged end 113 of the piston (FIGURE 9). The regulator piston 112 now operates on the valve 82, via bellcrank lever 96, in the position shown in FIGURE 3, and the fluidized plastic in chamber 60 operates to open the flow orifice 76 of valve member 84, thereby permitting the flow of the plasticized material therethrough and out through the injection nozzle orifice 70 into the mold plastic admission port under the thrust of piston members 128, 174 by the hydraulic pressure acting in pressure chamber 150 of the hydraulic cylinder 136.

As the mold becomes full of the plasticized material, the injection pressure in the nozzle chamber 80 increases until it equals the injection pressure in the injection nozzle chamber 78 and injection channel 88. Due to the differential in the end area of the end portion of slide valve 82 acted on by the pressurized material in nozzle chamber 80 with respect to the lack of a countering effective area of the slide valve 82 in nozzle chamber 78, the valve is forced to move backwardly against the force exerted by the regulator piston 112 acting on bellcrank lever 96 until its enlarged valve section 86 closes the valve orifice 76 of the nozzle valve component 74 thereby preventing further flow of the plasticized material, as shown in FIGURE 4. At this stage, the dog 160 on the end of piston rod 128 actuates switch 162 to cause a reversal of flow, as regards hydraulic chambers 144 and 150 of the hydraulic injection cylinder 136, chamber 144 now becoming the pressure chamber by the admission of pressure fluid thereto through port 154 to move piston toward the hydraulic cylinder end 148 in FIGURE 4, the chamber 150 now exhausting to the low pressure section of the hydraulic system.

With the release of hydraulic pressure from compression chamber 150, the hydraulic pressure in the nozzle valve regulator 110 by reason of its connection 122 to chamber 150 likewise becomes released. This drop in pressure (to atmospheric) negates the effect of regulator piston 112 against arm 102 of bellcrank 96 and permits the spring 124 of the nozzle valve regulator to simultaneously thrust the positioning piston 114 into contact with arm 102 to cause arm 100 of the bellcrank to move portion 84 of slide valve 82 into the nozzle orifice to close it against the escape of plasticized material therefrom. The hydraulic jack 34 is now actuated to slide the injection feeding apparatus on its slides H, H away from the admission port of the mold platen 4 until such time that the injection feeding procedure is to be repeated.

During the entire time that the plasticized material was being forced out of the orifice 70 of the injection nozzle 68 by the movement and thrust of the piston member 174 by piston 128, the worm 64 was continuously rotating and forcing the plasticized material into the transfer chamber 60 through passages 58 and 184. Even though the scavenging piston 126 was being moved by rods 156, at the same time as piston 174 was moved since the areas of their opposite ends were exposed to the fluid pressure in the chamber 150 of the hydraulic injection cylinder 136, the plasticized material was enabled to flow into the cylindrical transfer chamber 60 of the injection vessel 62. The flow was provided for by the co-action of flow channels 182 and 184 in the scavenging piston and chamber wall, respectively, since these channels are of such a length as to provide for its admission at all times, and since the scavenging piston 126 was prevented from closing them by reason of its stop flange 130.

During the simultaneous movement of the pistons 174 and 126 towards the left as viewed in FIGURE 3, it must be remembered that the rate of movement of the piston 174 may be greater than the volume of material displaced by the worm. As a consequence, the space between the pistons 174 and 126 accommodates itself to the rate of travel of the piston 174 and the displacement of the worm 64 by the action of the piston 126. In other words, the space between the pistons 174 and 126 enlarges with the plastic material forced therebetween by the worm during the forward stroke of the injection piston 174.

At the end of the leftward stroke of the piston 174 under the action of piston 134, the abutment 160 engages the switch means that energizes the circuit to reverse the valve 48. This causes the admission of fluid pressure to the chamber 144 and the release of pressure in the chamber 150 and the regulator 110. This results in the withdrawal of the piston 134 from abutment relation with the rod 128. As a further consequence, the rod 128 is moved by the trapped fluid pressure acting on its left end to move it relative to the piston 174 to open passage 180 and establish communication between the chambers 61 and 60.

Continued operation of the worm 64 feeding the plastic into the chamber 60 now results in the flow of the plastic into chamber 61 from chamber 60 causing it to continue to act to drive the piston 174 and the rod 128 towards the right to the limit of its motion in that direction where the rod again engages the end of the piston 134. The motion of the piston takes place at the rate determined by the rate of flow of the plastic material through the valved orifice in the piston 174. The piston 126 moved to the right at a greater rate than the piston 134 and reaches the end of its rightward motion before the piston 174. When piston 126 reaches the end of its stroke toward the right the abutment 158 engages the switch to close contacts 159. When the piston 174 reaches the end of its stroke, it closes contacts 164. The switches 159 and 164 are in series in a circuit that causes the reversal of the valve 48 to repeat the work cycle of the injection means, unless for reason the apparatus is set for one cycle operation.

For repetitious operation, the injection piston 174 would dwell in its righthand position only so long as it is required to remove the molded piece and reclose the mold and lock it in place, which with the present structure requires a very short time in the range of a few seconds. The timing of the apparatus is such that the operation of the emptying of the mold can be and is performed during the rightward motion of the pistons 174 and 126, so that at the end of the rightward travel the new empty mold is in place clamped and the injection apparatus moved into position for the repetition of the work cycle of the apparatus.

PRACTICAL ADVANTAGES AND STRUCTURAL CONSIDERATIONS

One of the main advantages of the injection mold feeding apparatus herein disclosed is its compactness and relative simplicity in structure as regards the forces it can exert during its operation. For example, assume that the apparatus is used for molding articles with weight of the order of 3 kilograms. The injection piston 134 can exert a thrust of 70 tons. With the three auxiliary abutment pistons 156 having a total cross-section of 15 sq. cm. and with the pressure chamber 150 subjected to a pressure of 200 kg. per sq. cm., the auxiliary pistons will exert a total thrust of 3 tons. With the bore of the chambers 60, 61 in vessel 62, will have a cross section of 130 sq. cm., and the piston rod 128 will have a cross-section of 30 sq. cm. The worm 64 forces the plasticized material into the transfer chamber 60 with a force of 50 kg. per sq. cm. At the end of the injection movement of the piston and piston rod members 174, 128, the thrust exerted by piston 134 produces within the plastic material in the injection chamber 61 a pressure of approximately 540 kg. per sq. cm. Since the effective area of the scavenging piston 126 is equal to the difference between the cross-section of transfer chamber 60 and piston rod 128 (130 sq. cm. −30 sq. cm.=100 sq. cm.) the scavenging piston 126 is thus subjected, by the plastic material contained in transfer chamber 60, to a thrust of 100×5 tons which is obviously greater than the 3 ton thrust of the three auxiliary abutment pistons.

In addition to contacts 162, 164, safety contacts may be advantageously provided to operate in the event of defective operation of the mold ejectors, or in the event the electric or hydraulic circuits associated with the apparatus fail to function.

Also, instead of the electrical contacts 162, 164, a hydromechanical mechanism starting off the piston 128 may be provided for controlling the operation of the injection mechanism. For example, piston 128 may operate a pivotal lever means connected to a hydraulic control valve.

Auxiliary hydraulic means may also be provided, if desired, for assisting in operating piston 128 between its retracted and extended positions.

Consistent with the above described embodiments, the following results can be appreciated:

(1) The invention, as disclosed, provides an efficient and relatively simple plasticized molding material injection-transfer apparatus in conjunction with an improved extrusion molding machine free of defects and deficiencies.

(2) Said invention provides injection-transfer apparatus for feeding plasticized material through an injection nozzle wherein the operation of all movable components of the apparatus is uninterrupted and continuous and wherein means are provided for automatically controlling the feeding of the plasticized material in conformity with the pressure obtained at the injection nozzle.

(3) Said injection-transfer apparatus and said injection nozzle provide movable components driven in continuous motion by power means and having regulator means directly responsive to both the pressure of the plasticized material at the injection orifice and the power means for effecting the flow of such material through said injection orifice.

(4) Said injection apparatus for feeding plasticized material through an outlet orifice and having flow control means responsive to the pressure of the plasticized material at said outlet orifice, is capable of forming relatively heavy articles wherein the injection feeding apparatus is relatively small and compact and develops relatively high injection pressures at a relatively low expenditure of energy.

(5) Said injection feeding apparatus and said injection nozzle include a continuously rotatable extrusion worm continuously feeding the plasticized material to variable volume transfer and injection chamber means, so that the apparatus maintains the material at uniform consistency and free of defects when injected to the mold from said nozzle.

(6) Said apparatus and its continuous motion plastic feeding means provide for automatic regulation of the flow of the material at the nozzle by its pressure and automatic repeating of cycle operations.

(7) The rotatable extrusion worm means in said molding apparatus is maintained in continuous rotation throughout the entire mold injection operations while the transfer and injection chamber means are simultaneously and continuously varied in volume with respect to a feeding passage between them which is successively opened and closed during the extruding operation.

(8) Said mold feeding system coacts with transfer and injection chambers and with the extrusion worm means, to achieve a maximum pressure in the transfer chamber in the direction of the extruding operation when the volume of the transfer chamber is increasing.

(9) Said feeding system provides for automatic regulation and control of the molding plastic material as the material flows from the outlet of said feeding system to the molding machine.

(10) Said improved molding machine permits the use of relatively small and compact force applying units for holding the mold components closed during the injection feeding operation, as well as during the injection feeding apparatus and for actuation of the entire system from a common source of fluid pressure.

(11) Said molding machine, its components, its injection feeding mechanism and its positioning means are all actuated in timed relation by a common source of power and a common hydraulic pressure system, thus achieving the ultimate in operational simplicity.

The apparatus according to the present invention obtains inter alia the following advantages in this process of injection-transfer molding:

(a) Since the apparatus is continuous in its functioning, it is unnecessary at any moment to halt the rotation of the extrusion worm. By varying the ratio of the motor-reduction gearing assembly, it is possible to adjust the speed of rotation of this worm to the exact value corresponding to the optimum molding tempo permitted by the plastification depending upon a number of parameters such as the heating power, the nature of the plastic material and the weight and shape of the molded pieces. Once the rotational speed has been regulated, the operations follow one another automatically under optimum conditions.

(b) It is possible to reduce the injection temperature, reduce the cooling time and raise the molding tempo; in fact the regulation effected by the plastic material and the usual hydraulic regulators, which produce harmful pressure losses are eliminated; and the hydraulic circuit, by reason of its simplicity, permits very rapid injection feeding.

(c) The molecular friction normally produced by the rotation of the extrusion worm contributes within the plastic material to the heating of the said material. The rotation of the worm being continuous, the plastification is improved. The molding cycle accordingly can be more rapid.

(d) The continuous rotation of the extrusion worm favors homogenization of the plastic material.

(e) As the transfer chamber is subjected as a whole at each cycle of the action of the scavenging piston, stagnation of the plastic material is avoided, because the material always flows continuously in the same direction from the extrusion worm towards and into the mold.

(f) As the scavenging piston is subjected during the entire duration of the injection cycle to the action of the auxiliary pistons, the transfer chamber is constantly maintained under pressure, even when the movable part advances. This prevents re-entry of air into the said chamber and insures the production of clean moldings devoid of air bubbles or cavities.

(g) Finally, the leakage of plastic material which occurs in conventional machines during the injection feeding as a result of the annular clearance of the injection piston in the injection chamber causes the flow of a part of the plastic material to the exterior. Even if this should occur in applicant's disclosed apparatus, it would have no harmful effect, since the leakage flow would then merely aid in re-supplying the transfer chamber.

While the invention has been described, disclosed, illustrated and shown in terms of a preferred embodiment which it has assumed in practice, the scope of the invention should not be deemed to be limited by the precise embodiment herein described and illustrated since other embodiments or modifications are intended to be reserved as they fall within the claims hereto appended.

What is claimed is:

1. In a molding machine of the class described comprising a mold having at least two sections which when assembled forms a molding cavity, adjustable jack means for moving said sections axially into assembled relationship, force multiplying thrust units for clamping said sections after they have been moved into assembled relationship, means for positioning said force multiplying thrust units axially of said mold to accommodate molds of varying characteristics and dimensions, and means permitting control of said force multiplying thrust units to control the forces applied by said units on said mold sections and thereby obtain the force required to clamp molded pieces of varying volumes.

2. In a molding machine of the class described, comprising mold sections a fluid pressure actuated jack means for moving one of said mold sections axially to open and closed positions relative to a complementary mold section, fluid pressure actuated force-multiplying thrust means positioned intermediate the jack and mold sections and movable transversely of said axial direction for maintaining the mold sections tightly closed during molding operations, and means positioning said force-multiplying thrust units in various axial positions to accommodate molds of varying dimensions.

3. In a molding machine comprising a mold having at least two sections which when assembled forms a molding cavity, the combination comprising means for moving said mold sections in an axial direction into assembled relationship, clamping means moveable transversely of said axial direction to clamp said mold sections after the latter have been moved into an assembled relationship said clamping means including force multiplying thrust units, and means for positioning the thrust units in an axial direction relative to said mold to accommodate different size molds, and means permitting adjustment of said force multiplying thrust units to control the forces applied by said units on said sections and thereby obtain the force required to clamp molded pieces of varying volume.

4. In a molding machine of the class described, comprising mold sections, a fluid pressure actuated jack means for moving one of said mold sections to open and closed positions relative to a complementary mold section, a thrust member engaging said one mold section and movable with the latter, fluid pressure actuated force-multiplying thrust means movable into the path of travel of said thrust member to clamp said mold sections and out of the path of travel of said thrust member to allow said jack means to move said one mold section between open and closed positions, and means for positioning said fluid pressure actuated force-multiplying thrust means axially of the path of the mold sections to provide for accommodation of mold sections of varying characteristics and dimensions.

5. In a molding machine, comprising mold sections, one of which is movable in one direction relative to the other, first means for moving said one mold section in said one direction into and out of assembled relationship, force-multiplying thrust units having a part movable transversely of said one direction, second means movable with said one mold section having a path of travel into and out of which said part of said force-multiplying thrust unit moves thereby to effect clamping of said mold sections after the latter have been placed in assembled relationship, and means for positioning said force-multiplying thrust units in various positions along said one direction thereby to accommodate different size mold sections to be assembled and clamped.

6. In a molding machine according to claim 5 wherein said first means is a fluid operated cylinder and piston operable to separate the mold sections to permit removal of the molded object.

7. In a molding machine according to claim 5 wherein said second means is a tubular thrust member having a cross-sectional area smaller than said one mold section.

8. In a molding machine according to claim 7 wherein said part of said force-multiplying thrust unit engages the end of said tubular thrust member to clamp said mold sections.

9. In a molding machine according to claim 5 wherein said first means comprises a fluid actuated rod, said second means comprising a tubular thrust member in which said rod operates at least in part.

10. In a molding machine according to claim 9 wherein said rod and tubular thrust member are coaxially disposed.

11. In a molding machine according to claim 5 wherein said means for positioning said force-multiplying thrust units comprises a hollow support means, said first means being operable, at least in part, within said hollow support means.

12. In a molding machine according to claim 11 further comprising means for moving said support means in said one direction.

References Cited

UNITED STATES PATENTS

| | | | |
|---|---|---|---|
| 2,111,857 | 3/1938 | Jeffery | 18—30 |
| 2,616,130 | 11/1952 | Banz | 18—30 |
| 2,671,247 | 3/1954 | Lester | 18—30 |
| 3,117,348 | 1/1964 | Rees | 18—30 |
| 2,831,214 | 4/1958 | Fyles et al. | 18—30 |
| 3,016,574 | 1/1962 | Fischer et al. | 18—30 |
| 2,359,013 | 9/1944 | Tucker | 264—329 |
| 2,890,491 | 6/1959 | Hendry | 264—329 |

WILBUR L. McBAY, *Primary Examiner.*

ALEXANDER H. BRODMERKEL, J. SPENCER OVERHOLSER, *Examiners.*

J. R. DUNCAN, *Assistant Examiner.*